United States Patent Office 3,053,804
Patented Sept. 11, 1962

3,053,804
LINEAR POLYMERIC METAL CHELATES FROM BIS(ACETOACETATES) AND BIS(ACETOACETA-MIDES)
John R. Caldwell and James C. Martin, Kingsport, Tenn., assignors to Eastman Kodak Company, Rochester, N.Y., a corporation of New Jersey
No Drawing. Filed May 8, 1958, Ser. No. 733,849
15 Claims. (Cl. 260—47)

This invention relates to synthetic linear polymeric metal chelates, to their preparation and to films, coating compositions, anti-fouling paints and the like made therefrom.

It is an object of this invention to provide new linear polymers having chelatable metals as part of the main chain of connecting atoms in the recurring polymeric units.

It is a further object to provide a novel process to prepare these new and quite valuable linear polymeric metal chelates.

Another object of this invention is to provide novel and especially advantageous fungicidal components to be used in agricultural dusts and sprays, such components having desirable physical and chemical properties exemplified by long effective life in contact with plant surfaces.

A still further object is to provide transparent polymeric film constituents containing metal atoms in a form which enables resulting films to serve as water-insoluble, long lasting, light absorption filters for photographic and other optical purposes.

Another object is to provide new components for antifouling paints for the water-exposed surfaces of boat hulls, the resulting painted surfaces which contain such components resisting attack by marine growths for exceptionally long periods under adverse conditions.

Other objects will become apparent elsewhere herein.

According to one embodiment of this invention there is provided a process for preparing a linear polymeric metal chelate comprising mixing with agitation (A) one mole proportion of a bis(acetoacetyl) compound having the following general formula:

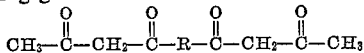

wherein R represent an organic radical containing from 1 to 40 carbon atoms having on each extremity an alpha and an omgea radical selected from the group consisting of an —NH— radical and an —O— radical, with (B) about one mole proportion of an organo-metallic compound having from 1 to 20 carbon atoms wherein the metal has a primary valence of 2 and a coordination number of 4 and the organic portion of said organo-metallic compound is a radical attached to said metal through an oxygen atom. This invention distinguishes from prior art wherein R in the above formula would represent a hydrocarbon radical. The products of this invention are not isomeric or homologous with those of the prior art and embody unexpected improved properties contributed by the carboxylic and/or amide linkages.

Advantageously, the preferred process of this invention can be performed in the presence of an inert diluent such as ethanol, ethylene glycol, heptane, benzene or the like. However, the polymerization can also be performed in the melt phase without diluents or catalysts. The solution technique is preferable especially where a relatively low molecular weight polymer is desired as where greater solubility may be advantageous in paint solvents or vehicles or the like. The temperature of the reaction in solution can be as low as 20° C.; in the melt phase process (no diluent), it is advantageous to apply heat under an inert atmosphere at a temperature sufficient to keep the reaction mixture sufficiently fluid to be agitated, e.g. up to 275° C. (generally at 150°–250° C.).

Of course, stated in its most simple terms the invention provides a process for forming a metal chelate condensation polymer which comprises reacting a bis(acetoacetyl) compound having the general formula given above with a compound of a metal in its divalent state selected from the group consisting of beryllium, copper, nickel, zinc, cobalt, iron, palladium, manganese, calcium, strontium, barium and cadmium.

Metals which have a primary valence of two and a coordination number of four are those which have just been named. In accordance with this invention, these metals are used in the form of organo-metallic compounds which ordinarily have from 1 to about 20 carbon atoms although it is obvious that those having a larger number of carbon atoms are equivalents. Moreover, it is not essential that an organo-metallic compound be used since other compounds which can be used include hydroxides and metal salts of inorganic acids such as beryllium hydroxide, zinc nitrate, etc.; however, the organo-metallic compounds are preferred and are intended to include for the purposes of this specification compounds such as barium cyanide, beryllium basic acetate, nickel acetylacetonates, etc.

The bis(acetoacetyl) compounds which can be used in preparing the synthetic linear polymeric metal chelates of this invention are readily obtainable and are economically feasible as polymer precursors. These compounds can be prepared either by the reaction of diketene with diamines or by the reaction of diketenes with glycols or diphenols in excellent yields. Moreover, variations in such compounds can be produced by merely varying the diamine, the glycol or the diphenol including the use of mixtures of such compounds which can include aromatic diamines, aliphatic diamines, aromatic glycols, cyclic glycols such as cyclohexanedimethanol, and any of the other vast variety of aromatic compounds containing two functional substituents selected from the group consisting of a hydroxyl substituent and an amino substituent.

Although this application covers two varieties of polymeric metal chelates, it is to be understood that those derived from the compounds having the above general formula wherein the extremities of the R radical are —NH— radicals are significantly different from those wherein the extremities of the R radical are —CO— radicals. Thus, there is no isomeric or homologous relationship between these compounds and distinct differences are achieved in the nature of the polymeric metal chelates with respect to optical qualities, permanence in coating compositions, resistance to high temperatures, fungicidal effects, water solubility, etc. Thus, an appropriate selection of the most desirable combination of properties for a given use is advantageous.

As mentioned above, the process provided by this invention can be advantageously carried out by reacting a bis(acetoacetyl) compound having the general formula given above with a chelating metal salt or a monomeric chelate in the monomer ratio of 1:1 either in the melt or in solution. If run in solution the polymer can be advantageously isolated either by precipitation with a non-solvent or the reaction solvent may be removed by evaporation.

Exemplary bis(acetoacetyl) compounds which can be used in accordance wtih this invention are those that are derived from any suitable glycol, diamine or diphenol as illustrated by the following formulas:

(a) Bis(acetoacetates), i.e. R in the general formula above is —O—R'—O— as follows:

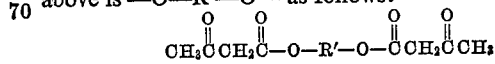

wherein R' represents (1) any straight or branched chain, unsaturated or saturated alkyl group, (2) an aliphatic radical containing an alkyl chain interrupted by ether linkages, (3)

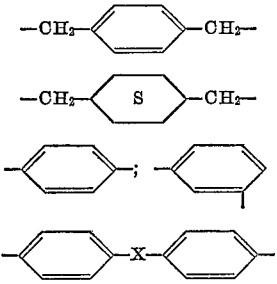

where X represents a —$C_nH_{2n}$— radical where $n$ is from 0 to 5 such as a direct bond between the two benzene rings or —$CH_2$—, —$CH_2CH_2$—, —$CH(CH_3)$—,

—$C(CH_3)_2$— etc., or X represents a radical such as —$OCH_2CH_2O$—, —$SO_2$—, —S—,

—$N(CH_3)$—, —$CF_2$—,

—O—, etc.

(b) Bis(acetoacetamides), i.e. R in the general formula above is —NH—R''—NH— as follows:

where R'' can be the same as R' described under (a) above and R'' can also be such that —NH—R''—NH— represents the following radical:

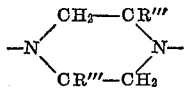

wherein each R''' is a hydrogen atom or an alkyl radical containing from 1 to 5 carbon atoms.

Some typical examples of advantages bis(acetoacetates) and bis(acetoacetamides) are: 1,4-tetramethylene bis(acetoacetate),

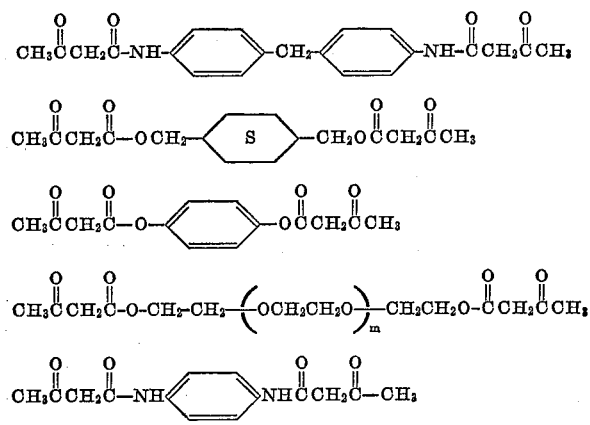

etc.

The metals suitable for use in this invention are ones that have a primary valence of 2 and a coordination number of 4. Such metals are beryllium, zinc, nickel, manganous manganese, copper, cobaltous cobalt, calcium, barium, strontium, cadmium, and palladous palladium.

In the above formulas the letter S within a hexagon is intended to represent a saturated cyclohexylene radical and $m$ represents a small positive integer from about 1 to 10.

The organo-metallic compounds which can be reacted with one or more of the bis(acetoacetyl) compounds having the above general formula have already been described hereinabove. It is well known that the enumerated metals will form well-defined chelate compounds with ethyl acetoacetate to give a structure shown below:

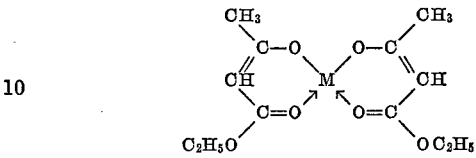

where M is one of the metals described hereinabove.

The reaction which takes place in forming the polymeric metal chelates of this invention appears to produce polymers which have formulas which can be illustrated as follows:

Either

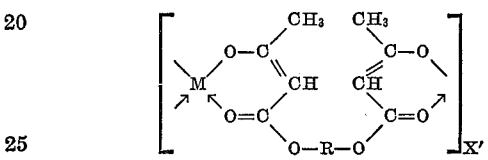

or

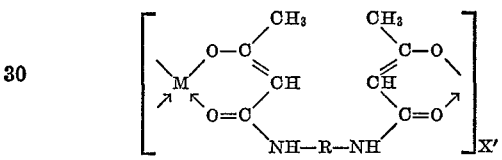

wherein X' represents the number of repeating units which are hooked together through the previously defined metallic atoms represented by M so as to produce the polymeric metal chelate molecules. It is not known what the value of the letter X' might be but it is presumed that it is a large integer.

As previously mentioned, the process of this invention can be conducted in solution or as a melt. Suitable solvents for the reaction are those in which the starting materials and the resulting polymer are soluble. Higher molecular weights may be obtained by using the melt technique. However, a high molecular weight is not desirable for certain preferred uses of these polymers; hence, where medium or low molecular weight is sought, then the solution technique is to be preferred.

The organometallic compounds used in the process of this invention can be metallic salts, such as the acetate, or metallic chelates. The chelates have advantages in that they are, in general, more soluble in organic solvents and lower melting. In preparing such metallic chelates, suitable chelating compounds are acetylacetone, ethyl acetoacetate, etc. The salts have the advantage in that their initial cost is lower and when higher molecular weight organic acids are used to form them, their solubility in organic solvents is much increased.

The versatility of this invention is apparent from the great variety of bis(acetoacetates) and bis(acetoacetamides) that can be employed. These compounds can be prepared from diketene and glycols or diphenols and diamines, etc. The melting points of the polymers prepared by this invention have great latitude, since the structure of the intermediates can be changed to achieve desired results. By selection of a given metal a polymer can be made that contains a low percentage by weight of metal, such as beryllium, or a polymer that has a high percentage by weight of a metal such as barium. By using a bis(acetoacetate) derived from a polyethylene glycol, such as one of the Carbowaxes, the metal influence on the polymer can be made relatively low. Some of the polymers of this invention are quite high melting, but if desired the melting points can be lowered by using a different bis(acetoacetate) or bis(acetoacetamide) or by copolymerizing two such related or dissimilar intermediates. If unsaturated bis(acetoacetates) and bis(acetoacetamides) are employed, a thermosetting polymer can be prepared by heating the linear polymer with a peroxide catalyst to produce cross-linking.

The new polymers are characterized by their stability at high temperatures and can be heated at 250–300° C. for relatively long periods with only slight decomposition. They can be used in the form of molded objects, fibers and films. In most cases, the polymers are colored, the color depending upon the metal used. Hence, the products can be used as colored pigments for natural and synthetic films, fibers, molding compositions, etc., e.g. cellulose acetate, polyvinyl chloride, polyethylene terephthalate, acrylonitrile polymers and copolymers, nylon, etc.

The new chelate polymers are of particular value as ingredients of fungicidal paints. The copper polymers, for example, can be incorporated in various types of paints and other protective coatings. Using such polymers which have a high molecular weight prevents the polymer from being leached from the paint film and the polymer serves as a source of copper in the film for quite extensive periods of time. The polymers containing copper are of particular value as ingredients of anti-fouling paints for ships and can be incorporated into formulas for spar varnishes and other coatings for marine use.

This invention can be further illustrated by the following examples of preferred embodiments although it will be understood that these examples are included merely for purposes of illustration and are not intended to limit the scope of the invention unless otherwise specifically indicated.

*Example 1*

To a solution of 2.62 g. (0.013 mole) of cupric acetate, monohydrate in 120 ml. of ethanol was added slowly with stirring a solution of 3.36 g. (0.013 mole) of 1,4-tetramethylene bis(acetoacetate) in 20 ml. of ethanol. The color of the reaction solution changed from blue to green. Stirring was continued for 3 hours. The reaction solution was poured into 500 ml. of water and a precipitate of green polymer came down. This polymer gave no color to the solution when stirred in boiling water. A film cast from dioxane solution was transparent, green in color and very tough. It had a melting point of 210–230° C. The results of analysis showed:

Percent copper (found) _____ 17.58
Percent copper (theoretical) _____ 19.8

This polymer as described in Example 1 is valuable as a source of copper in anti-fouling paint for ships. The polymer was ground to pass a 200 mesh screen and then mixed into a quick-drying tun oil varnish in the amount of 1 pound to the gallon. A steel plate was coated on one side with the paint over a standard primer. The test plate was immersed in sea water for 6 months. The coated side was substantially free of growths, while the uncoated side was heavily encrusted with barnacles and other marine growths.

The polymer of Example 1 is also valuable as a source of copper in fungicides and insecticides. It was ground to pass a 200 mesh screen and one part was mixed with 25 parts of bentonite clay. The mixture was dusted on tomato plants. It was found to be effective in reducing the damage to the plant due to fungi and insects, when compared with untreated control plants. Tests showed that copper was still being slowly released after 4 weeks' exposure.

*Example 2*

A mixture of 20.7 g. (0.1 mole) of beryllium acetylacetone and 22.8 g. (0.1 mole) of ethylene bis(acetoacetamide) was stirred continuously. The reaction mixture was heated under nitrogen at 220–230° C. and acetylacetone began distilling out of the mixture. Stirring was continued and the system was put under a vacuum of 0.5 mm. to distill out the last traces of low boilers. The material in the reactor became quite viscous. After 3 hours of stirring at 220–230° C., the resulting polymer had attained a high molecular weight.

When converted into films, this polymer was valuable as a photographic filter. The absorption band of the film is characteristic of the beryllium ion.

*Example 3*

A mixture of 25.7 g. (0.1 mole) of nickel acetylacetone and 27.8 g. (0.1 mole) of p,p'-phenylene-bis(acetoacetate) was treated as described in Example 2. The reaction mixture was heated for 5 hours at 240° C. under high vacuum. The resulting polymer had a high molecular weight and films cast from dimethylformamide were clear and pliable.

In the form of films, this polymer was valuable as a photographic filter. The absorption band of the film is characteristic of the nickel ion. The filter is unaffected by water, in contrast to the usual type made from dyed gelatin.

Other polymers were similarly prepared using other starting materials as explained hereinabove. Analogous results were obtained.

Although the invention has been described in considerable detail with reference to certain preferred embodiments thereof, it will be understood that variations and modifications can be effected without departing from the spirit and scope of the invention as described hereinabove and as defined in the appended claims.

We claim:

1. A process for preparing a chelate condensation polymer which comprises reacting (A) one mole proportion of a bis(acetoacetyl) compound having the following general formula:

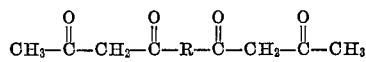

wherein R represents an organic radical containing from 1 to 40 carbon atoms, said R being composed between its extremities of no other atoms than carbon, hydrogen and oxygen atoms, said R having on each extremity an alpha and an omega connecting radical directly attached to each of the innermost

radicals in the above formula, said connecting radical being selected from the group consisting of an —NH— radical and an —O— radical, said alpha and omega radicals being attached only to a C atom which is in turn attached only to a member selected from the group consisting of C, H and oxy atoms, with (B) about one mole proportion of an chelatable metallic compound wherein the metal itself is the chelating agent, said metallic compound having no more than about 20 carbon atoms wherein the metal has a primary valence of 2 and a coordination number of 4, said metallic compound being selected from the group consisting of salts of organic carboxylic acids, organometallic chelates of acylated ketones and organometallic chelates of acylated carboxylic acid esters.

2. A process defined in claim 1 wherein the organometallic compound is cupric acetate monohydrate.

3. A process as defined in claim 1 wherein the organometallic compound is beryllium acetylacetone.

4. A process as defined in claim 1 wherein the organometallic compound is nickel acetylacetone.

5. A process as defined in claim 2 wherein the bis(acetoacetyl) compound is 1,4-tetramethylene bis(acetoacetate).

6. A process as defined in claim 3 wherein the bis(acetoacetyl) compound is ethylene bis(acetoacetamide).

7. A process as defined in claim 4 wherein the bis(acetoacetyl) compound is p,p'-phenylene-bis(acetoacetate).

8. A solid highly polymeric metal chelate capable of forming a film essentially composed of a condensation polymers of substantially equimolar proportions of (A) a bis(acetoacetyl) compound having the following general formula:

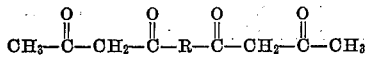

wherein R represents an organic radical containing from 1 to 40 carbon atoms, said R being composed between its extremities of no other atoms than carbon, hydrogen and oxygen atoms, said R having on each extremity an alpha and an omega connecting radical directly attached to each of the innermost

radicals in the above formula, said connecting radical being selected from the group consisting of an —NH— radical and an —O— radical, said alpha and omega radicals being attached only to a C atom which is in turn attached only to a member selected from the group consisting of C, H and oxy atoms, and (B) a chelatable metal having a primary valence of 2 and a coordination number of 4.

9. A chelate condensation polymer as defined in claim 8 wherein M represents a copper atom and R represents a 1,4-dioxy-tetramethylene radical.

10. A chelate condensation polymer as defined in claim 8 wherein M represents a beryllium atom and R represents a 1,2-diaminoethylene radical.

11. A chelate condensation polymer as defined by claim 8 wherein M represents nickel and R represents a p,p'-dioxyphenylene radical.

12. A film comprising a polymeric metal chelate as defined by claim 8.

13. A film comprising a polymeric metal chelate as defined by claim 9.

14. A film comprising a polymeric metal chelate as defined by claim 10.

15. A film comprising a polymeric metal chelate as defined by claim 11.

References Cited in the file of this patent
UNITED STATES PATENTS

| | | |
|---|---|---|
| 2,307,075 | Quattlebaum | Jan. 5, 1943 |
| 2,659,711 | Wilkins et al. | Nov. 17, 1953 |
| 2,933,475 | Hoover et al. | Apr. 19, 1960 |

FOREIGN PATENTS

| | | |
|---|---|---|
| 1,112,395 | France | Jan. 5, 1943 |

OTHER REFERENCES

Gilman: Organic Chemistry—An Advanced Treatise, vol. 2, 2nd edition, Wiley (1950), pp. 1868–1871.

Rochow et al.: The Chemistry of Organometallic Compounds, Wiley & Sons (1957), pp. 278–279.